United States Patent [19]

Goto et al.

[11] 4,314,042

[45] Feb. 2, 1982

[54] COMPOSITION FOR POWDER COATING

[75] Inventors: Jugo Goto, Kawanishi; Fumihiro Doura, Sakai, both of Japan

[73] Assignee: Takeda Chemical Industries, Ltd., Osaka, Japan

[21] Appl. No.: 173,908

[22] Filed: Jul. 30, 1980

[30] Foreign Application Priority Data

Jul. 30, 1979 [JP] Japan .................................. 54-97780

[51] Int. Cl.³ ............................................... C08F 8/30
[52] U.S. Cl. ......................................... 525/59; 427/25; 427/181; 428/441; 428/461; 525/61
[58] Field of Search ..................................... 525/59, 61

[56] References Cited

U.S. PATENT DOCUMENTS 3,752,793 8/1973 Arlt et al. .......................... 260/42.52
3,935,138 1/1976 Wingler et al. .................... 260/42.52
4,102,946 7/1978 Imura et al. .......................... 525/59

FOREIGN PATENT DOCUMENTS 49-110485 2/1974 Japan ..................................... 525/59

Primary Examiner—Stanford M. Levin
Attorney, Agent, or Firm—Wenderoth, Lind & Ponack

[57] ABSTRACT

A composition for powder coating which comprises a carboxyl-containing polymer of not lower than 40° C. in softening point prepared by reacting a dicarboxylic acid anhydride with a hydroxyl-containing polymer obtained by saponifying a copolymer from a vinyl ester of a saturated monocarboxylic acid and a copolymerizable vinyl monomer, and a compound having two or more oxazaline rings in the molecule, from which are obtained coating layers with toughness and flexibility useful for coating glass bottles, etc.

8 Claims, No Drawings

COMPOSITION FOR POWDER COATING

The present invention relates to a novel composition for powder coating.

In more particular, the invention relates to a powdery coating composition which comprises a particular carboxyl-containing polymer with or without a carboxyl-containing resin, and an oxazoline compound.

Already known are powdery compositions for coating comprising a carboxyl-containing polymer produced by copolymerizing acrylic acid or methacrylic acid and other polymerizable vinyl monomers and an oxazoline compound (U.S. Pat. No. 3,752,795). Also, already known are powdery coating compositions which comprise a carboxyl-containing polymer prepared by reacting a dicarboxylic acid anhydride with a polymer obtained by copolymerizing a hydroxyalkyl-(metha)acrylate and other polymerizable vinyl monomers, and an oxazoline compound (U.S. Pat. No. 3,935,138). In employing a polymer as powdery coating composition, it is essential to set its softening point within a suitable and limited range. The known compositions have a disadvantage in that they cannot meet the said requirement without providing resultant coating layers with decreased toughness and flexibility, therefore reduced impact resistance.

The present inventors, after extensive research conducted in view of such circumstances, found that a powder coating composition comprising a particular carboxyl-containing polymer and an oxazoline compound, when baked, yields coating layers with tough physical properties, especially exhibiting outstanding impact resistance and also excellent resistance to chemicals and water.

A lot of investigation made on the basis of such finding has led to completion of the present invention.

Thus, the present invention relates to a composition for powder coating, which comprises a carboxyl-containing polymer of not lower than 40° C. in softening point prepared by reacting a dicarboxylic acid anhydride with a hydroxyl-containing polymer obtained by saponifying a copolymer from vinyl ester of saturated monocarboxylic acid and copolymerizable vinyl monomer, and a compound having two or more oxazoline rings in the molecule.

As the vinyl ester of a saturated monocarboxylic acid, which is useful in the present invention, there may be mentioned vinyl esters of $C_{2-8}$ saturated aliphatic monocarboxylic acids such as vinyl acetate and vinyl propionate and, particularly, vinyl acetate is suitably used. Examples of the vinyl monomer which is copolymerizable with such vinyl esters of saturated monocarboxylic acids include ethylene, propylene, butadiene, isoprene, chloroprene, styrene, methylstyrene, chlorostyrene, vinyl chloride, vinyl bromide, vinyl fluoride, vinylidene chloride, acrylonitrile, methyl vinyl ether, ethyl vinyl ether, etc. Among these copolymerizable vinyl monomers, especially suitable is ethylene.

Methyl acrylate, methyl methacrylate, ethyl acrylate, ethyl methacrylate, butyl acrylate, butyl methacrylate, octyl acrylate, octyl methacrylate, etc. can be employed in addition to the above vinyl monomer, but it should be taken into consideration that these are also saponified during the saponification reaction to produce carboxyl groups, which reacts with oxazolines to form crosslinkages in the course of forming of coating layers.

One of the more preferable examples of the copolymer is an ethylene-vinyl acetate copolymer.

The proportion of the vinyl ester of the saturated monocarboxylic acid to the vinyl monomer for copolymerization is preferably 5 to 50 mole % of the former and 50 to 95 mole % of the latter. The copolymer produced by the copolymerization has preferably a molecular weight of 2000 to 500,000.

Saponification of the copolymer, for which a conventional manner is employable, for example, can be conducted in a system comprising a low-boiling alcohol such as methanol, ethanol and propanol and an alkali catalyst such as sodium methylate and sodium hydroxide. This may be carried out in the presence of an organic solvent such as benzene, toluene and xylene. The degree of saponification is preferably in the range of about 5 to about 98%. Conditions of saponification reaction may vary to a minor extent with the desired degree of saponification, and normally, such reaction can be conducted at a temperature of 10° to 100° C. for a period of 10 to 180 minutes.

The dicarboxylic acid anhydride employable for the reaction with the hydroxyl-containing polymer resulting from the saponification may be any of aliphatic, alicyclic and aromatic ones having $C_4$ to $C_{12}$. As examples of such acid anhydride there may be mentioned succinic anhydride, maleic anhydride, citraconic anhydride, itaconic anhydride, endic anhydride, methylendic anhydride, chlorendic anhydride, phthalic anhydride, methylhexahydrophthalic anhydride, hexahydrophthalic anhydride, methyltetrahydrophthalic anhydride, etc. Among these anhydrides, especially suitable are succinic anhydride, phthalic anhydride, hexahydrophtalic anhydride and methylhexahydrophthalic anhydride. These anhydrides may be used alone or as a mixture of two or more of them.

In conducting the addition reaction of the hydroxyl-containing polymer with the acid anhydride, the reaction temperature is desirably maintained at not higher than 150° C., and, in cases in which the reaction needs to be conducted at a temperature of not lower than 150° C., it is required that the reaction time be strictly controlled to prevent the reaction mixture from resulting in gelation. The carboxylated ratio of the hydroxyl groups formed through the saponification of the copolymer is preferably within the range of 10 to 100 percent. Thus, there may be obtained a carboxyl-containing polymer having normally an acid number of 30 to 200 and a softening point of not lower than 40° C.

As the compound having two or more oxazoline rings in the molecule, which is useful in the present invention, a compound of the following general formula is suitably employed:

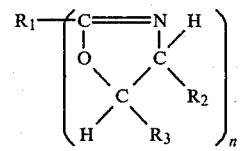

wherein n is an integer of 2 to 4, preferably of 2; $R_1$ is an n-valent aliphatic or aromatic hydrocarbon of 1 to 12 carbon atoms, preferably of 2 to 6 carbon atoms; $R_2$ and $R_3$ are each hydrogen or hydrocarbon radical having 1 to 3 carbon atoms.

Specific examples of the compound having the oxazoline ring of the above-mentioned general formula include:

1,2-Bis-(Δ2-oxazolinyl-2)-benzene;
1,3-Bis-(Δ2-oxazolinyl-2)-benzene;
1,4-Bis-(Δ2-oxazolinyl-2)-benzene;
1,2-Bis-(Δ2-4-methyl-oxazolinyl-2)-benzene;
1,3-Bis-(Δ2-4-methyl-oxazolinyl-2)-benzene;
1,4-Bis-(Δ2-4-methyl-oxazolinyl-2)-benzene;
1,2-Bis-(Δ2-5-ethyl-oxazolinyl-2)-benzene;
1,3-Bis-(Δ2-5-ethyl-oxazolinyl-2)-benzene;
1,4-Bis-(Δ2-5-ethyl-oxazolinyl-2)-benzene;
1,2,4-Tris-(Δ2-oxazolinyl-2)-benzene;
1,3,5-Tris-(Δ2-oxazolinyl-2)-benzene;
1,2,4,5-Tetrakis-(Δ2-oxazolinyl-2)-benzene;
1,2-Bis-(Δ2-oxazolinyl-2)-ethane;
1,4-Bis(Δ2-oxazolinyl-2)-butane; and
1,4-Bis(Δ2-5-methyl-oxazolinyl-2)-butane.

Among these examples, as preferable ones there may be mentioned 1,3-bis-(Δ2-oxazolinyl-2)-benzene, 1,4-bis-(Δ2-oxazolinyl-2)-benzene and 1,3-bis-(Δ2-5-methyl-oxazolinyl-2)-benzene.

The proportion of the carboxyl-containing polymer to the oxazoline ring-containing compound to be mixed is normally recommended to be chosen in such a way that the ratio of (carboxyl group)/(oxazoline ring) is between 0.5 to 3.0.

For the purpose of obtaining a coating layer with desired physical properties, a carboxyl-containing resin may be used, as a third component for the composition of the present invention, in addition to the carboxyl-containing polymer as described above. Such a carboxyl-containing resin includes a resin prepared by the addition reaction of a dicarboxylic acid anhydride with an acryl polyol, a resin prepared by copolymerizing acrylic and/or methacrylic acid and other copolymerizable vinyl monomers, and a carboxyl-terminated polyester resin.

Among these carboxyl-containing resins, the most preferable and useful one is a carboxyl-terminated polyester resin, which is prepared by reacting a low molecular weight polyol with a dicarboxylic acid or anhydride thereof. As the polyol and dicarboxylic acid (anhydride) components of the polyester resin, a low molecular weight diol having cyclohexylene ring and a dicarboxylic acid having a cyclohexylene or cyclohexenylene ring or an anhydride thereof are employed. Examples of the diol include hydrogenated bisphenol A, 1,4-cyclohexane dimethanol, 1,4-cyclohexane diol, etc. and examples of the dicarboxylic acid or anhydride thereof include tetrahydrophthalic acid (anhydride), methyltetrahydrophthalic acid (anhydride), hexahydrophthalic acid (anhydride), methylhexahydrophthalic acid (anhydride), 3,6-endomethylenetetrahydrophthalic acid [hymic acid] (anhydride), methyl-3,6-endomethylenetetrahydrophthalic acid (anhydride), etc. In addition to the said components, it is expedient to employ molecular weight polyols such as ethylene glycol, propylene glycol, hexylene glycol, neopentyl glycol, glycerine and trimethylol propane, etc. and dicarboxylic acids (or anhydrides) such as succinic acid (anhydride), maleic acid (anhydride), adipic acid, fumaric acid, sebacic acid, terephthalic acid, isophthalic acid and phthalic acid (anhydride), etc.

Such additional components can be preferably employed within the range of not more than 60 mole % to the total moles of the polyol and acid components composed of the polyester resin. The polyester resin thus obtained has good compatibility with the carboxyl-containing polymer, which serves to produce transparent high glossy layers.

The carboxyl-terminated polyester resin can be prepared by a conventionally known esterification method and preferably has a molecular weight of 400 to 7000.

There may be mentioned, as preferable resins, a polyester resin from hexahydrophthalic anhydride and/or methylhexahydrophthalic anhydride and hydrogenated bisphenol A. The amount of the carboxyl-terminated polyester resin to be added can be chosen within the range of zero to 4 weight parts to one weight part of the carboxyl-containing polymer. When a carboxyl-containing resin is additionally employed, the ratio of total carboxyl groups to oxazoline rings can be chosen within the same range as described above, i.e. 0.5 to 3.0.

Thus, another embodiment of the present invention is a composition for powder coating which comprises a carboxyl-containing polymer as defined above, a carboxyl-containing resin, particularly a carboxyl-terminated polyester resin, as defined above, and an oxazoline compound as mentioned above. The composition containing the carboxyl-containing resin, particularly the polyester resin, provides coating layers having desirable properties such as good hardness as well as toughness and flexibility.

When necessary, auxiliary agents such as fillers, levelling agents, surfactants, catalysts, pigments and dyes and the like can be added.

So as to prepare the powdered composition, a method conventional per se is employable: for example, a mixture of the carboxyl-containing polymer with or without the carboxyl-containing resin, a compound having an oxazoline ring and a variety of additives is melt-kneaded in an extruder, and pulverized or freeze-pulverized to produce a powdery composition. After being kneaded by heated rolls, the kneaded material may be pulverized. Furthermore, each of such components may be dissolved or dispersed in a solvent, and the solutions or dispersions are mixed with each other and the solvent is removed by heating under reduced pressure, followed by pulverizing. Moreover, each of such components can be powdered and the powdered components are mixed to produce a powdery coating composition. The employable particle size of the powder after being pulverized is normally 5 to 500 microns. In order to allow a narrow particle size distribution, the resultant powder may be sieved to obtain either particles of a larger size or of a smaller size alone or particles of a uniform size with the larger and smaller sizes eliminated. For coating the powdery composition on the surface of a substance, methods conventional per se are employed; for example, the powdery composition can be coated by the aid of an electrostatic powder coating equipment, an electrical-field curtain type powder coating equipment, etc. In addition, a fluidized immersion method or flame-spraying method can also be used.

After coating, the heating is effected in a heating furnace to form cured coating layers. Conditions of baking in which the temperature of the substance is within the range of 140° to 200° C. and wherein the baking time is between 10 to 60 minutes, which is normally sufficient. When baking is conducted at an increased temperature, the baking time can be reduced.

The powder coating composition of the present invention is applied to various substances such as metal, glass, concrete, iron pipes, ceramics, roofing tiles, etc. The resultant coating layer displays excellent adhesive, weather resistance, water resistance and chemical resistance as well as improved impact resistance, and are particularly suited for use in coating for preventing crushing of glass bottles for carbonated soft drinks.

EXAMPLE 1

In a stainless steel reaction vessel of 20 l-capacity, 3450 parts of an ethylene-vinyl acetate copolymer (vinyl acetate content: 28 weight %, MI* 150 g/10 min.) was dissolved in 6900 parts of xylene. Then, to the solution were added 1437 parts of methanol and 202 parts of 24% methanolic solution of sodium methylate. The mixture was heated at 45°–50° C. for 60 minutes, followed by addition of 49 parts of water and stirring for 30 minutes to allow the reaction to stop. (*MI stands for Melt Index.) The isolated reaction product showed a saponification degree of 90% and a melt index of 85 g/10 min. The reaction solution thus obtained was heated up to 100° C. to distill off methanol and methyl acetate formed as by-products, followed by the addition of 510 parts of succinic anhydride. The mixture was heated at a temperature of 100° C. for 1 hour. The reaction solution was cooled down to 70° C., to which was added 15,000 parts of methanol, whereby a polymer precipitated. The precipitate was collected by separation and dried. The acid-value of the product was 80.1.

The product was freeze-pulverized and the crushed powder was subjected to sieving with a 100-mesh sieve. 700 parts of the powder which passed the sieve and 108 parts of 1,3-bis($\Delta$2-oxazolinyl-2)-benzene which also passed the sieve of 100 mesh were mixed, and the mixture was coated on the surface of glass bottles by means of a powder coating machine, followed by curing through baking at 180° C. for 30 minutes, whereby the bottles were coated with resin layer of 300 $\mu$-thickness.

The bottle for test was filled with water and, under application of inner pressure of 3.5 kg/cm$^2$, an impact was impacted to cause the bottle to be destroyed, whereby the glass was destroyed into pieces but without being scattered, thus the bottle retained its original shape. The coating layer showed no change in appearance both by the immersion test in boiling water for 15 minutes and by the spot test with ethyl acetate. In addition, yellowing of the layer is hardly observed by irradiation with UV rays for 50 hours.

EXAMPLE 2

Employing 1530 parts of phthalic anhydride instead of 510 parts of succinic anhydride in Example 1, the same procedures as those of Example 1 were conducted to obtain a polymer of 125.2 in acid value. 448 parts of the polymer and 108 parts of 1,4-bis($\Delta$2-oxazolinyl-2)-benzene were melt-blended and the blended material was freeze-grinded. The powder thus obtained was coated electrostatically by spraying on an iron plate and then cured by baking at the temperature of 180° C. for 30 minutes. The results obtained by the performance evaluation test are as follows:

| Cross hatch adhesion test | 100/100 |
| Impact (Du Pont Method) | ¼", 1 kg, 50 cm, passed |
| Bending 2 mm, passed | |
| Erichsen 8 mm, passed | |
| Spot test with ethyl acetate | passed |
| Thickness of coating layer | 80 $\mu$ |

EXAMPLE 3

100 parts of the hydroxyl-containing polymer (MI 85 g/10 min., saponification degree 90%) obtained in Example 1 was dissolved in 200 parts of xylene. To the solution was added 25.7 parts of hexahydrophthalic anhydride. The mixture was stirred at 100° C.–105° C. for 60 minutes. To the reaction solution, 500 parts of methanol was added to allow the reaction product to precipitate. The precipitates were separated from the solution by filtration and dried under reduced pressure. The carboxyl-containing polymer thus obtained showed a melt index of 45.2 g/10 min. a melting point of 94° C. to 97° C. and an acid value of 70.6. 100 parts of the polymer was mixed with 15 parts of 1,3-bis-($\Delta$2-oxazolinyl-2)-benzene and the mixture was pressed with a heating roll to form a sheet, followed by pulverizing the sheet into powder. The powder was again pressed with a heating roll to form a sheet, followed by pulverizing the sheet into powder, whereby a composition for powder coating was obtained. The powder composition thus obtained was coated on the surface of a glass plate and baked at a temperature of 180° C. for 30 minutes, whereby a transparent layer was produced.

The physical properties of the layer were as follows:

| Tensile Strength | 210 kg/cm$^2$ |
| Elongation | 305% |
| Pencil Hardness | <6B |

EXAMPLE 4

20 parts of the carboxyl-containing polymer (MI 45.2 g/10 min., acid value 70.6) obtained in Example 3 was mixed with 10 parts of the carboxyl-terminated polyester resin prepared by reacting 3 moles of hexahydrophthalic anhydride with 2 moles of hydrogenated bisphenol A, and 4 parts of 1,3-bis-($\Delta$2-5-methyloxazolinyl-2)-benzene. The mixture was melt-blended by means of an extruder, followed by freeze-pulverizing into a powder, whereby a composition for powder coating was obtained.

The powdery composition thus obtained was coated on the surface of a glass plate and baked at 200° C. for 30 minutes, whereby a cured layer having a transparent appearance was produced.

The physical properties of the coating layer were as follows:

| Tensile Strength | 360 kg/cm$^2$ |
| Elongation | 130% |
| Pencil Hardness | 3B |

EXAMPLE 5

100 parts of the hydroxyl-containing polymer (MI 85 g/10 min., saponification degree 90%) was dissolved in 200 parts of xylene. To the solution was added 16.8 parts of methylhexahydrophthalic anhydride. The mixture was subjected to the reaction and after treatment as described in Example 3 to obtain a carboxyl-containing polymer having a melt index of 59.8 g/10 min., an acid value of 43 and a softening point in VICAT of 80° C. 20 parts of the carboxyl-containing polymer thus obtained was melt-blended with 10 parts of the carboxyl-terminated polyester resin composed of 14 moles of hexahydrophthalic anhydride, 9 moles of hydrogenated bisphenol A and 1 mol of trimethylol propane, and 4 parts of 1,3-bis-(Δ2-oxazolinyl-2)-benzene. The blended material was pulverized into powder, whereby a composition for powder coating was obtained. The powder composition was coated on the surface of an iron plate and then baked at 180° C. for 30 minutes. The physical properties of the cured layer were as follows:

| | |
|---|---|
| Pencil Hardness | 3B |
| Impact (Du Pont Method) | ¼", 1kg, 50cm passed |
| Cross-hatch adhesion test | 100/100 |
| Bending | 2 mm passed |
| Erichsen | 8 mm passed |
| Spot test with ethyl acetate | passed |

The layer thus obtained was transparent in appearance. Thus, the composition are particularly suited for use in coating for preventing from crushing of glass bottles for carbonated soft drinks.

What is claimed is:

1. A composition for powder coating which comprises a carboxyl-containing polymer of not lower than 40° C. in softening point prepared by reacting a dicarboxylic acid anhydride with a hydroxyl-containing polymer obtained by saponifying a copolymer of a vinyl ester of a saturated monocarboxylic acid and a copolymerizable vinyl monomer, and a compound having two or more oxazoline rings in the molecule, said hydroxyl-containing polymer comprising 5 to 50 mole % of the vinyl ester of a saturated monocarboxylic acid and 50–95 mole % of the copolymerizable vinyl monomer, and wherein the proportion of the carboxyl-containing polymer to the oxazoline ring-containing compound is such that the ratio of the carboxyl groups in the polymer to the oxazoline rings is 0.5 to 3.0.

2. A composition as claimed in claim 1, wherein the copolymer from the vinyl ester of a saturated monocarboxylic acid and the copolymerizable vinyl monomer is an ethylenevinyl acetate copolymer.

3. A composition as claimed in claim 1, wherein the compound having two or more oxazoline rings in the molecule is a compound of the formula

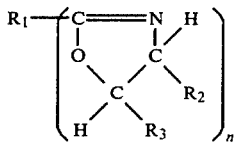

wherein n is an integer of 2 to 4, $R_1$ is a n-valent aliphatic or aromatic hydrocarbon of 1 to 12 carbon atoms, $R_2$ and $R_3$ are each a hydrogen or hydrocarbon radical having 1 to 3 carbon atoms.

4. A composition as claimed in claim 1, wherein the carboxylic acid anhydride is a member selected from the group consisting of succinic anhydride, maleic anhydride, citraconic anhydride, itaconic anhydride, endic anhydride, methylendic anhydride, chlorendic anhydride, phthalic anhydride, hexahydrophthalic anhydride, methylhexahydrophthalic anhydride, and methyltetrahydrophthalic anhydride.

5. A composition for powder coating which comprises a carboxyl-containing polymer of not lower than 40° C. in softening point prepared by reacting a dicarboxylic acid anhydride with a hydroxyl-containing polymer obtained by saponifying a copolymer of a vinyl ester of a saturated monocarboxylic acid and a copolymerizable vinyl monomer, a carboxyl-terminated polyester resin, and a compound having two or more oxazoline rings in the molecule, said hydroxyl-containing polymer comprising 5 to 50 mole % of the vinyl ester of a saturated monocarboxylic acid and 50–95 mole % of the copolymerizable vinyl monomer; the proportion of the carboxyl-containing polymer to the oxazoline ring-containing compound is such that the ratio of the carboxyl groups in the polymer to the oxazoline rings is 0.5 to 3.0; and in which the carboxyl-terminated polyester resin is present in such amounts that the ratio of the total carboxyl groups to the oxazoline rings is in a ratio of 0.5 to 3.0.

6. A composition as claimed in claim 5, wherein the carboxyl-terminated polyester resin is a resin prepared by reacting a low molecular weight diol having a cyclohexylene ring and a dicarboxylic acid having a cyclohexylene or a cyclohexenylene ring or anhydrides thereof.

7. A composition as claimed in claim 6, wherein the diol having a cyclohexylene ring is a member selected from the group consisting of hydrogenated bisphenol A, 1,4-cyclohexane dimethanol and 1,4-cyclohexane diol and the dicarboxylic acid having a cyclohexylene or a cyclohexenylene ring is a member selected from the group consisting of tetrahydrophthalic acid, methyltetrahydrophthalic acid, hexahydrophthalic acid, methylhexahydrophthalic acid, 3,6-endomethylenetetrahydrophthalic acid, methyl-3,6-endomethylenetetrahydrophthalic acid and anhydrides thereof.

8. A composition as claimed in claim 6, wherein the carboxyl-terminated polyester resin is a resin from a hexahydrophthalic anhydride and/or a methylhexahydrophthalic anhydride and a hydrogenated bisphenol A.

* * * * *